Patented June 10, 1947

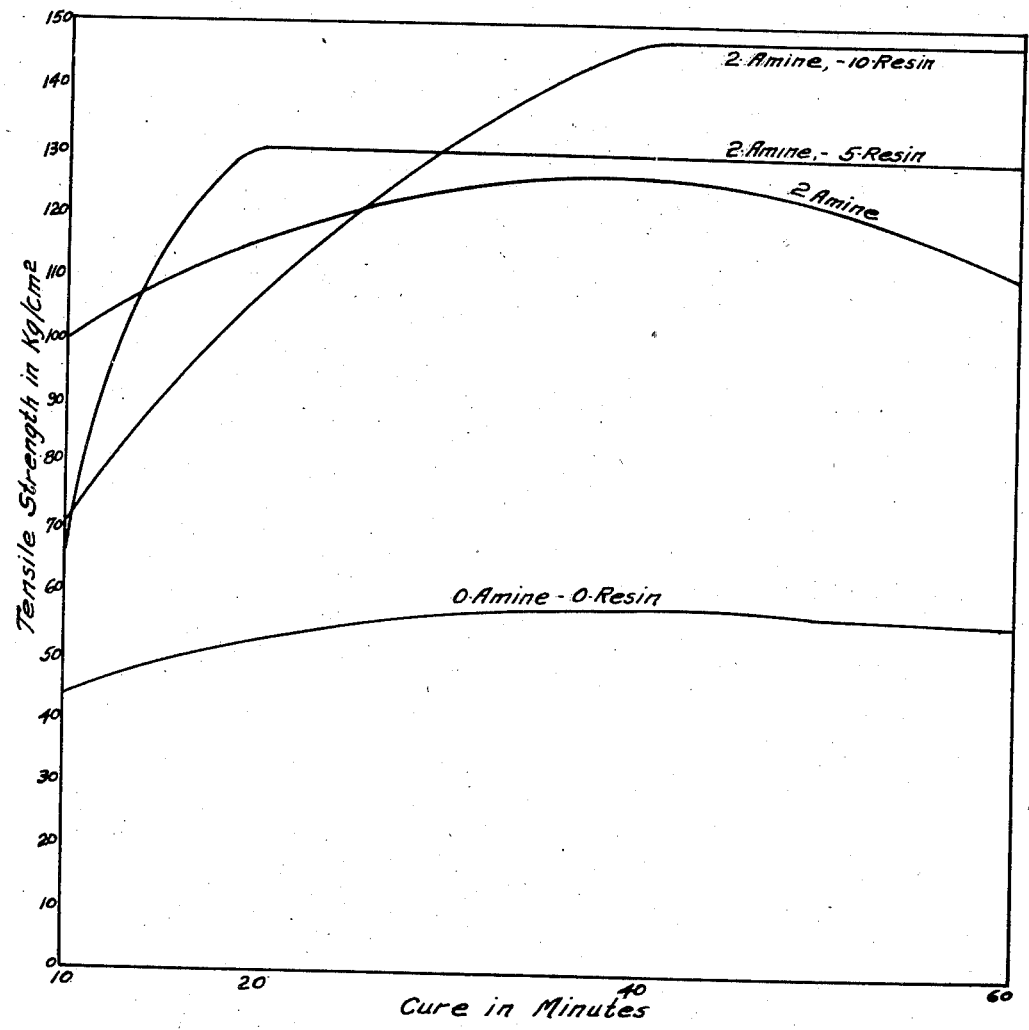

2,421,852

UNITED STATES PATENT OFFICE 2,421,852

THERMOSETTING COMPOSITION CONTAINING VINYL CHLORIDE-VINYLIDENE CHLORIDE COPOLYMER

Thomas H. Rogers, Jr., and Robert D. Vickers, Akron, Ohio, assignors to Wingfoot Corporation, Akron, Ohio, a corporation of Delaware Application June 11, 1943, Serial No. 490,489

8 Claims. (Cl. 260—43)

This invention relates to improved plastic compositions having desirable thermosetting characteristics and to a method of making the same. More particularly, it relates to the effect of phenol-formaldehyde type resins in the curing of polymerized masses with amines.

A thermoplastic resin which can be made thermosetting is obviously desirable in the manufacture of molded parts where the resin must be easily manipulable before setting and comparatively immobile after it has been given its final shape. This is also true in the manufacture of extruded articles where the resin must be soft enough in the uncured state to be extruded and then, when subjected to pressure and heat, to become set. Also, a resin having these characteristics would find use in the building of structures from fabric coated with the resin, such as pontoons, inflatable boats, and gas containers. In the manufacture of such fabric articles, a seam which is sealed with the resin must be capable of withstanding a test load at an elevated temperature without flow. A method of treating resins with certain amines to give the desired thermosetting characteristics has been devised and is the subject of our copending application Serial No. 481,076, filed March 30, 1943, of which the present application is a continuation in part.

That method comprises heating a copolymer of vinyl chloride and vinylidene chloride in certain proportions in the presence of an aliphatic amine, particularly a polyalkylene polyamine, until the tensile strength of the plastic has been increased over that of the uncured resin. Useful results are attained when the increase in tensile strength amounts to at least 50%.

It has now been found that still further improvement in these thermosetting resins can be brought about by the inclusion of a heat-hardenable or thermosetting phenol-formaldehyde type resin which, in conjunction with the amine, gives a flat curing curve. The advantages of a material which cures in this manner without changing in tensile strength over a curing period of say twenty to sixty minutes is obvious. Close timing of the curing period is eliminated, together with the danger of overcuring and loss of tensile strength. The maximum tensile strength attainable appears to be the same as when an aliphatic amine alone is used, or even a slightly greater strength may be achieved. However, the chief advantage realized by the presence of one of the "phenolics" or "Bakelite" resins, as these are commercially known, is in the flattening of the curing curve.

The invention is particularly applicable to the treatment of vinyl chloride-vinylidene chloride copolymers, especially those containing from 10% to approximately 25% of vinylidene chloride, the balance of the monomeric mixture, 90% to 75%, from which the copolymer is made, being vinyl chloride. Particularly good results are obtained by the treatment of copolymers ranging from about 10% to 20% of vinylidene chloride, and correspondingly, from about 90% to 80% of vinyl chloride. Among others, many commercial resins may be treated with advantage, including copolymers of vinyl chloride-vinylidene chloride 85:15 and 90:10.

The cure or vulcanization of the resin is accomplished by heating the copolymer to a curing temperature, such as a temperature between about 240° and 360° F., although the temperature may be higher or lower than this, in the presence of an aliphatic amine and a phenol-formaldehyde type resin. The desired result is not attained in the absence of the amine. Suitable aliphatic amines include N-monomethyl-propylene-diamine, di-(3-amino propyl) methylamine, m-dipropylene triamine, mono hexadecyl amine, triethyl amine, and di-(3-amino propyl) ether. The alicyclic amines, such as m-phenylene-diamine and dibenzylamine, are also useful. Among the heat-hardenable phenol-formaldehyde type resins which may be used are those of cresol-formaldehyde, phenol-formaldehyde, xylenol-formaldehyde, resorcinol-formaldehyde and phenol-furfural. Other similar "Bakelite" resins may also be used. The composition of such resins is usually that corresponding to combining proportions or to substantially equally molecular proportions of the phenolic compound and the aldehyde.

The amine is incorporated in the copolymer in the proportion of about 1% to 10% on the weight of the copolymer but best results are usually obtained when 4% to 6% is used. The phenol-formaldehyde type resin is incorporated in the proportion of about 2% to 10% on the copolymer, but preferably from 5% to 10% is employed. In general, the cure will be conducted so as to give an increase in tensile strength of at least 50% over that of the uncured copolymer since, otherwise, results of practical importance are not attained. That is to say, an increase in tensile strength of less than 50% does not improve the characteristics of the plastic sufficiently to make it valuable for the uses herein described.

In addition to the aliphatic amine and the phenol-formaldehyde resin, there may be present in the stock to be cured an acid inhibitor or acceptor, such as magnesium oxide, sodium carbonate and magnesium carbonate, which, while not essential for cure, aids in preventing the deterioration of the composition at the elevated temperatures of cure, and gives optimum physical properties. Magnesium oxide is particularly valuable in this respect. There will also be present in most instances a plasticizer, such as dibutyl sebacate, methoxy ethyl oleate, dioctyl phthalate, tributyl phosphate, and the like, although it will be understood that the plasticizer is not strictly necessary in carrying out the method of the invention. However, the plasticizer may affect the rate of cure and to this extent, must be considered in connection with the performance of the process. Also, the plasticizer is required in varying amounts to give a stock of selected characteristics, the desired improvement being obtained as a result of the influence of the cure in the presence of the plasticizer. Carbon black and other pigments may also be present as desired.

The effect of the cure on plastics intended for the production of molded parts and other purposes is to increase their strength and resistance to flow and also to reduce their solubility in solvents. The modulus is also improved as compared with the uncured stock. All of these advantages, obtainable by curing in the presence of an aliphatic amine as described in our copending application, are retained in the practice of the present method with the further advantage that the composition presents these characteristics over a wide variation in curing times. The effect of the phenol-formaldehyde resin on the copolymer is not observed in the absence of the aliphatic amine, as mentioned, and is also not noted if the resin is added merely as a filler in the fully cured state, even though finely ground and thoroughly dispersed in the composition. The phenol-formaldehyde resin also has been shown not to act merely as an acid acceptor, and it is probable that its function is that of a secondary vulcanizing agent whereby it cooperates with the hexamethylene tetramine or other aliphatic amine which is present to maintain the tensile strength of the composition throughout the cure.

To illustrate the invention, the following examples are given, the same being merely illustrative and not intended in a limiting sense.

*Example*

A suitable stock was prepared by mixing granular or powdered vinyl chloride-vinylidene chloride copolymer (85:15) with about 25% of the total dibutyl sebacate to be added as a plasticizer. The mix was then placed on a hot mill. After ten minutes mixing the remainder of the dibutyl sebacate was added, followed by magnesium oxide and carbon black in the proportions indicated below. Before the hexamethylene tetramine and the cresol-formaldehyde resin are added to the mass, the mill is cooled by running cold water through it. Two parts of hexamethylene tetramine are then added, followed by the indicated amounts of cresol-formaldehyde. In certain runs either the amine or resin is omitted for purposes of comparison. After the amine and the resin have been entirely incorporated, the stock is sheeted out and cut for cure. Cure was effected by placing the stock between aluminum foil to prevent sticking, and then cured in a press at a temperature of 320° F. under a pressure of 1500 lbs. per square inch. A basic stock such as this may be additionally compounded, if desired, so as to be readily removed directly from a hot mold, using no aluminum foil.

The following results were obtained upon test, the tensile strength and elongation being determined on an autographic Scott machine, and the solubility in methyl ethyl ketone (MEK) being determined by rubbing the cured stock with a cloth saturated with the solvent, the carbon black in the stock serving as an indicator.

| | (1) | (2) | (3) | (4) | (5) | (6) |
|---|---|---|---|---|---|---|
| *Formulae* | | | | | | |
| Vinyl-vinylidene chloride polymer | 100.00 | 100.00 | 100.00 | 100.00 | 100.00 | 100.00 |
| Dibutyl sebacate | 35.00 | 35.00 | 35.00 | 35.00 | 35.00 | 35.00 |
| MgO | 2.00 | 2.00 | 5.00 | 5.00 | 5.00 | 2.00 |
| Cresol-formaldehyde | | | 10.00 | 5.00 | 10.00 | 10.00 |
| Hexamethylene tetramine | | 2.00 | | 2.00 | 2.00 | 2.00 |
| *Results* | | | | | | |
| Tensile in kg./cm.² at room temp.: | | | | | | |
| Cure at 320° F. for 10 min | 44 | 100 | 48 | 64 | 70 | 68 |
| Cure at 320° F. for 20 min | 52 | 116 | 50 | 130 | 95 | 90 |
| Cure at 320° F. for 40 min | 58 | 126 | 54 | 125 | 148 | 140 |
| Cure at 320° F. for 60 min | 56 | 110 | 52 | 130 | 148 | 106 |
| Elongation at room temp. in per cent: | | | | | | |
| Cure at 320° F. for 10 min | 200 | 300 | 200 | 225 | 225 | 225 |
| Cure at 320° F. for 20 min | 250 | 325 | 200 | 265 | 225 | 250 |
| Cure at 320° F. for 40 min | 250 | 250 | 170 | 170 | 185 | 225 |
| Cure at 320° F. for 60 min | 250 | 200 | 175 | 150 | 150 | 150 |
| Solubility in methyl ethyl ketone:[1] | | | | | | |
| Cure at 320° F. for 10 min | S | SS | S | SS | SS | S |
| Cure at 320° F. for 20 min | S | NS | S | NS | NS | SS |
| Cure at 320° F. for 40 min | S | NS | S | NS | NS | NS |
| Cure at 320° F. for 60 min | S | NS | S | NS | NS | NS |
| Hardness by Type A Durometer at room temp.: | | | | | | |
| Cure at 320° F. for 10 min | 70 | 75 | 68 | 79 | 81 | 81 |
| Cure at 320° F. for 20 min | 72 | 76 | 70 | 82 | 81 | 81 |
| Cure at 320° F. for 40 min | 72 | 77 | 70 | 79 | 82 | 81 |
| Cure at 320° F. for 60 min | 74 | 77 | 71 | 81 | 84 | 82 |

[1] S—Soluble. SS—Slightly Soluble. NS—Not Soluble.

It will be noted that the tensile strength was more than doubled by the use of hexamethylene tetramine alone, over that obtained when no amine was present, and that a still further increase in tensile strength was attained when the cresol-formaldehyde resin was also included; this increase being dependent to some extent on the amount of resin added. Virtually no improvement resulted when the cresol-formaldehyde resin was added without the amine. Magnesium oxide, or similar acid acceptor or inhibitor, should, of course, be present for optimum results, but the presence or absence of such a substance does not affect the comparative results obtained. The influence of the amine and of the phenol-formaldehyde resin in conjunction therewith is especially apparent in the accompanying drawing, which displays several curves based on the data of the foregoing example. Thus, the effect of the hexamethylene tetramine by itself is shown by comparison with the curve attained when no amine and no resin is added to the vinyl-vinylidene chloride copolymer. In addition to this, it will be noted that, while the curve for hexamethylene tetramine drops off quickly when the cure is continued for sixty minutes, no such effect is observed where the cresol-formaldehyde resin is present, the curve showing no tendency to dip during a sixty minute cure. This is true both when five parts of resin are included and when this amount is increased to ten parts, the only difference being an increase in the tensile strength.

It will also be noted that the solubility of the copolymer in methyl ethyl ketone progressively disappears as the cure continues, although this is not true where the cure is carried out in the absence of the amine and the phenol-formaldehyde resin.

The products treated by the herein described method thus have their properties improved in a number of respects, tending toward materials of more useful characteristics. As mentioned, the tensile strength is increased, this being true both at room temperature and at higher temperatures, such as 135° F., a temperature often used as a standard for testing the strength of adhesive materials. At the same time, the tendency of the resin to cold flow is sharply reduced, while no appreciable increase in hardness is apparent, despite the addition of the phenol-formaldehyde type resin. The shear strength is also greatly improved.

The products may be described as resinous compositions comprising a copolymer of vinylidene chloride and vinyl chloride, plus the residues of an amine and a phenol-formaldehyde type resin. Upon heating such a mixture, either with or without a plasticizer, a profound change in physical properties takes place and the resin becomes thermosetting. Accompanying this is a change in the chemical structure of the resin, as evidenced by nitrogen extraction, and more particularly, chlorine extraction. Also, there is probably a chemical combination between the phenol-formaldehyde resin and the vinyl-vinylidene chloride copolymer, or between the copolymer, the amine, and the resin. As above stated, the effect is due to more than physical inclusion of the resin in the composition.

While there has been described above a preferred embodiment of the invention, it will be apparent to those skilled in the art that various modifications and changes may be made therein without departing from the spirit of the invention or from the scope of the appended claims.

We claim:

1. A method of curing a co-polymerized vinyl chloride-vinylidene chloride plastic prepared from about 10% to 25% of vinylidene chloride and then about 90% to 75% of vinyl chloride which comprises incorporating from 1–10 percent (based on the weight of the copolymer) of an aliphatic polyalkylene polyamine and from 2–10 percent of a heat hardenable resin prepared by the condensation of one of the phenols with one of the aldehydes therein and then subjecting the plastic to heat until there is obtained a material having a tensile strength at least 50% greater than that of the uncured stock.

2. A method of curing a co-polymerized vinyl chloride-vinylidene chloride plastic prepared from about 10% to 25% of vinylidene chloride and the balance vinyl chloride which comprises incorporating from 1–10 percent (based on the weight of the copolymer) of an aliphatic polyalkylene polyamine and from 2–10 percent of a heat hardenable resin prepared by the condensation of one of the phenols with one of the aldehydes therein and then subjecting the plastic to a temperature of about 240° to 360° F. until there is obtained a material having a tensile strength at least 50% greater than that of the uncured stock.

3. A method of curing a co-polymerized vinyl chloride-vinylidene chloride plastic prepared from about 10% to 25% of vinylidene chloride and the balance vinyl chloride which comprises incorporating therein from 1–10 percent (based on the weight of the copolymer) of dimethyl amine and from 2–10 percent of a heat hardenable cresol-formaldehyde resin and then subjecting the plastic to heat until there is obtained a material having a tensile strength at least 50% greater than that of the uncured stock.

4. A method of curing a copolymer prepared from 75–90 percent vinyl chloride and 10–25 percent of vinylidene chloride which comprises mixing the copolymer with from 1–10 percent (based on the weight of the copolymer) of di(3-amino propyl) methylamine and from 2–10 percent of a heat hardenable phenol-formaldehyde resin and subjecting the mixture to a temperature between 240° F. and 360° F. until a material is obtained having a tensile strength at least 50 percent greater than the uncured stock.

5. A method of curing a copolymer prepared from 75–90 percent vinyl chloride and 10–25 percent of vinylidene chloride which comprises mixing the copolymer with from 1–10 percent (based on the weight of the copolymer) of di(3-amino propyl) methylamine and from 2–10 percent of a heat hardenable cresol-formaldehyde resin and subjecting the mixture to a temperature between 240° F. and 360° F. until a material is obtained having a tensile strength at least 50 percent greater than the uncured stock.

6. A method of preparing a thermoset copolymer which comprises mixing a copolymer prepared from 75 to 90 percent of vinyl chloride and 25 to 10 percent of vinylidene chloride with from 1 to 10 percent by weight of dimethyl amine and from 2 to 10 percent by weight of a heat-hardenable resin prepared by the condensation of one of the phenols with one of the aldehydes, then subjecting the copolymer to a temperature between 240° F. and 360° F. until there is obtained a polymeric material having a tensile strength of at least 50 percent greater than that of the uncured stock.

7. A method of preparing a thermoset polymer which comprises mixing a copolymer prepared from 75 to 90 percent by weight of vinyl chloride and 25 to 10 per cent of vinylidene chloride with from 1 to 10 percent of an aliphatic amine made up of only carbon, hydrogen and amino nitrogen atoms and from 2 to 10 percent by weight of a heat-hardenable resin prepared by the condensation of one of the phenols with one of the aldehydes, and then subjecting the copolymer to heat until there is obtained a polymeric material having a tensile strength at least 50 percent greater than that of the uncured stock.

8. A method of preparing a thermoset polymer which comprises mixing a copolymer prepared from 75 to 90 percent by weight of vinyl chloride and 25 to 10 percent of vinylidene chloride with from 1 to 10 percent by weight of an aliphatic amine made up of only carbon, hydrogen and amino nitrogen atoms, and from 2 to 10 percent of a heat-hardenable cresol formaldehyde resin, and then subjecting the copolymer to a temperature between 240° F. and 360° F. until there is obtained a polymeric material having a tensile strength at least 50 percent greater than that of the uncured stock.

THOMAS H. ROGERS, Jr.
ROBERT D. VICKERS.

REFERENCES CITED

The following references are of record in the file of this patent:

UNITED STATES PATENTS

| Number | Name | Date |
|---|---|---|
| 2,117,591 | Alexander | May 17, 1938 |
| 2,245,742 | Alexander et al. | June 17, 1941 |
| 2,148,831 | Raynolds | Feb. 28, 1939 |
| 2,270,662 | Raney | Jan. 20, 1943 |
| 2,304,637 | Hardy | Dec. 8, 1942 |
| 2,013,941 | Young | Sept. 10, 1935 |
| 2,190,776 | Ellingboe | Feb. 20, 1940 |
| 2,336,792 | Langkammerer | Dec. 14, 1943 |